United States Patent
Stolt

(10) Patent No.: US 8,757,328 B2
(45) Date of Patent: Jun. 24, 2014

(54) METHOD AND DEVICE FOR THE STARTUP OF AN ELECTRIC DRIVE OF AN ELEVATOR

(75) Inventor: Lauri Stolt, Helsinki (FI)

(73) Assignee: Kone Corporation, Helsinki (FI)

( * ) Notice: Subject to any disclaimer, the term of this patent is extended or adjusted under 35 U.S.C. 154(b) by 0 days.

(21) Appl. No.: 13/597,922

(22) Filed: Aug. 29, 2012

(65) Prior Publication Data

US 2012/0318613 A1    Dec. 20, 2012

Related U.S. Application Data

(63) Continuation of application No. PCT/FI2011/000014, filed on Mar. 11, 2011.

(30) Foreign Application Priority Data

Mar. 15, 2010    (FI) ...................................... 20105258

(51) Int. Cl.
*B66B 1/34*    (2006.01)

(52) U.S. Cl.
USPC .......................................... 187/393; 187/293

(58) Field of Classification Search
USPC .................. 187/247, 289, 290, 293, 296, 297, 187/391–393
See application file for complete search history.

(56) References Cited

U.S. PATENT DOCUMENTS

| | | | | |
|---|---|---|---|---|
| 4,649,751 A | * | 3/1987 | Onoda et al. | 73/658 |
| 5,780,786 A | * | 7/1998 | Miyanishi | 187/293 |
| 5,848,671 A | | 12/1998 | Kattainen | |
| 7,703,579 B2 | * | 4/2010 | Tyni et al. | 187/393 |
| 8,464,841 B2 | * | 6/2013 | Birrer et al. | 187/393 |
| 2008/0135346 A1 | | 6/2008 | Kattainen et al. | |
| 2010/0133046 A1 | * | 6/2010 | Allwardt et al. | 187/251 |
| 2012/0152663 A1 | * | 6/2012 | Legeret et al. | 187/404 |
| 2012/0181118 A1 | * | 7/2012 | Choi et al. | 187/393 |
| 2012/0193171 A1 | * | 8/2012 | Kangas | 187/287 |

FOREIGN PATENT DOCUMENTS

| | | |
|---|---|---|
| EP | 1621507 A1 | 2/2006 |
| GB | 2133541 A | 7/1984 |
| JP | 10114478 A * | 5/1998 |
| JP | 10157938 A | 6/1998 |
| JP | 2007169002 A | 7/2007 |
| WO | WO-2006082274 A2 | 8/2006 |

OTHER PUBLICATIONS

Translation JP 10114478 A.*
International Search Report PCT/ISA/210 for International Application No. PCT/FI2011/000014 dated May 19, 2011.
Written Opinion of the International Searching Authority PCT/ISA/237 for International Application No. PCT/ISA/237 dated May 19, 2011.

* cited by examiner

*Primary Examiner* — Anthony Salata
(74) *Attorney, Agent, or Firm* — Harness, Dickey & Pierce, P.L.C.

(57) ABSTRACT

The invention relates to a method and to devices for starting up an electric drive of an elevator. In the method a sensor that detects the direction of movement of the elevator car is fitted into the elevator system, the elevator car is brought into a state of movement, the direction of movement of the elevator car is detected from the measuring signal of the aforementioned sensor that detects the direction of movement of the elevator car and also the drive direction of the electric drive is connected in the control of the electric drive to the detected direction of movement of the elevator car.

19 Claims, 2 Drawing Sheets

METHOD AND DEVICE FOR THE STARTUP OF AN ELECTRIC DRIVE OF AN ELEVATOR

CROSS REFERENCE TO RELATED APPLICATIONS

This is a continuation of PCT/FI2011/000014 filed Mar. 11, 2011, which is an International Application claiming priority to FI 20105258 filed on Mar. 15, 2010, the entire contents of which are hereby incorporated by reference.

FIELD OF THE INVENTION

The invention relates to some methods and devices for facilitating the startup of an electric drive of an elevator.

BACKGROUND OF THE INVENTION

The electric drive of an elevator attends to the moving of an elevator car in an elevator hoistway between stopping floors. The control system of an elevator forms the target value for the speed of the elevator car, i.e. the speed reference, for the electric drive.

The electric drive comprises the hoisting machine of the elevator, which hoisting machine comprises an electric motor, which nowadays is usually an alternating-current motor. The electrical energy supplied to the stator in the electric motor is converted into rotational energy of the rotor, and conversely the rotational energy of the rotor is converted back into electrical energy during motor braking. The hoisting machine also comprises a traction sheave, which is mechanically attached to the rotor or to the shaft of the rotor. The elevator car is suspended in the elevator hoistway with ropes passing via the traction sheave, and moving force is transmitted from the traction sheave to the elevator car via the suspension ropes.

An electric drive often also comprises a separate power supply device, e.g. a frequency converter, with which the power supply between the electricity network and the hoisting machine of the elevator is adjusted. By adjusting the power supply between the hoisting machine and the electricity network, the speed of the elevator car can be changed steplessly.

An electric drive is generally taken into use already at an early stage during the construction or modernization of an elevator, because the elevator car to be moved with the electric drive can be used for the installation work to be performed in the elevator hoistway.

When installing an electric drive the hoisting machine of the elevator is fixed into the position reserved for it in the machine room or in the elevator hoistway. The frequency converter is connected to the supply cables of the hoisting machine and to the electricity supply of the building. The hoisting machine can be fixed to a special machine bedplate, or it can also be fixed e.g. to the guide rail of the elevator car or of the counterweight in the elevator hoistway.

When the electric drive has been installed into its position, a startup must still be performed for it by setting, among other things, the directions of movement of the elevator car and also the control parameters of the electric drive such that the elevator car can be driven in the desired directions in a controlled manner according to the speed reference. An elevator fitter sets the directions of movement of the elevator car generally visually by driving the hoisting machine with the frequency converter and by inspecting the direction of rotation of the traction sheave of the hoisting machine. The fitter can also directly inspect the direction of movement of the elevator car to be moved in the elevator hoistway, but this can be awkward, especially in the types of elevator systems in which the hoisting machine and the frequency converter are disposed in a machine room from where there is no direct line of sight into the elevator hoistway. Based on his/her observations, the fitter connects the drive direction of the frequency converter and the direction of movement of the elevator car to each other such that the elevator car can be driven in the detected drive directions with the frequency converter. This connecting can be done e.g. by manually entering data about the direction of movement of the elevator car from the user interface of the frequency converter.

This type of startup of an electric drive, to be performed visually and manually, complicates and slows down the installation work of an elevator. In addition, the risk of human error increases. Often an electric drive is also installed in its entirety in the elevator hoistway, in which case a fitter must perform the startup of the electric drive from the elevator hoistway, which increases the danger attached to the work.

SUMMARY OF THE INVENTION

One object of the invention is to disclose a method that is faster and simpler than prior art for performing the startup of an electric drive by detecting the direction of movement to be used in the control of the electric drive by means of a sensor that detects the direction of movement. To achieve this aim the invention discloses a method for bringing the electric drive of an elevator into operating condition, a frequency converter, and also an elevator control unit. Some inventive embodiments and various inventive combinations of the embodiments are also presented in the descriptive section and in the drawings of the present application.

In the method according to the invention for starting up the electric drive of an elevator, a sensor that detects the direction of movement of the elevator car is fitted into the elevator system, the elevator car is brought into a state of movement, the direction of movement of the elevator car is detected from the measuring signal of the sensor that detects the direction of movement of the aforementioned elevator car and the drive direction of the electric drive is connected in the control of the electric drive to the detected direction of movement of the elevator car. The aforementioned sensor that detects the direction of movement of the elevator car is preferably an acceleration sensor, which acceleration sensor is fitted in connection with the elevator car. Acceleration sensor refers here to a sensor that measures the actual acceleration exerted on the sensor taking into account also the acceleration due to gravity. The overall acceleration indicated by the acceleration sensor according to the invention is therefore formed from the vector sum of the acceleration caused by the movement of the sensor and the acceleration due to gravity. By means of this type of sensor it is possible to detect vertical movement of the sensor. By fitting the acceleration sensor in connection with the elevator car to move along with the elevator car it is therefore possible to detect the directions of movement of an elevator car moving in essentially the vertical direction explicitly without a fitter needing to determine the directions of movement from the rotation of the hoisting machine of the elevator or by visually inspecting the movement of the elevator car. This enables the automatic detection of the directions of movement of the elevator car. In addition to an acceleration sensor, the direction of movement of the elevator car can be detected e.g. with a transmitter-receiver pair that measures the absolute position of the elevator car and that is based on the propagation of an optical or acoustic measuring signal, one part of which transmitter-receiver pair is fitted in connection with the elevator car and the other part is fitted to a stationary part of the elevator hoistway.

In a preferred embodiment of the invention the elevator car is brought into a state of movement by driving the elevator with the electric drive. The elevator car could, however, be brought into a state of movement also by exploiting a possible imbalance of the loading of the elevator. In this case when opening the machinery brakes of the hoisting machine of the elevator, the force difference acting on the different sides of the traction sheave of the hoisting machine cause the elevator car to start to move. The drive direction of the electric drive could in this case be connected to the detected direction of movement of the elevator car e.g. by measuring, in addition to the direction of movement of the elevator car, also the measuring signal of the movement measuring sensor of the hoisting machine of the elevator during the movement of the elevator car, and also by selecting the polarity of the speed feedback and the corresponding speed reference of the elevator such that the elevator car can be driven in the detected direction of movement of the elevator car by controlling the electric drive with the speed reference in question.

In a preferred embodiment of the invention the polarity of the speed control loop to be used in the control of the electric drive is selected on the basis of the detected direction of movement of the elevator car and also the polarity of the angular feedback to be used in the control of the electric drive is selected on the basis of the detected direction of movement of the elevator car. In this case the direction of movement of the elevator car is made to correspond to the speed reference formed by the elevator control system such that the movement of the elevator car is directed upwards or downwards according to the elevator calls handled by the elevator control system.

In one embodiment of the invention the elevator is driven with the electric drive in the detected direction of movements, information about the torque requirement of the hoisting machine of the elevator is collected during a run with the elevator, and the positive feedback of torque to be used in the control of the electric drive is fine-tuned by means of the information about the torque requirement of the hoisting machine of the elevator collected during a run with the elevator.

In one embodiment of the invention the elevator is driven by controlling the electric drive without feedback from the movement measuring sensor of the hoisting machine for detecting the direction of movement of the elevator car. In one embodiment of the invention the elevator is driven using the speed control loop in the control of the electric drive for determining the torque requirement of the hoisting machine of the elevator. In this case the polarities of the feedbacks of the control of the electric drive can be determined on the basis of the detected directions of movement of the elevator car.

In one embodiment of the invention the frequency response of the speed control loop is determined in connection with a run with the elevator and the amplification of the speed regulator is fine-tuned on the basis of the frequency response of the speed control loop.

According to the invention, the startup of the electric drive can be performed by giving a start command, e.g. from the interface of the electric drive or from a service center, and the software of the control unit of the electric drive can perform the startup automatically after it has received the start command.

In one embodiment of the invention the direction of movement of the elevator car is detected and the torque requirement of the hoisting machine of the elevator is determined during the same run with the elevator. In this way the startup of the elevator is speeded up and the number of necessary learning runs of the elevator is reduced.

In one embodiment of the invention parameters are preselected for the control of the electric drive using configuration software. The parameters can be preselected already in conjunction with the delivery of the elevator, and the preselected parameters offer a good basis for startup of the electric drive. When the parameters are selected in advance such that they are set at least roughly correctly, the startup can be speeded up.

One frequency converter according to the invention comprises an input for the measuring signal of the acceleration sensor. The frequency converter also comprises a control unit, which is arranged to detect the direction of movement of the acceleration sensor from the measuring signal of the aforementioned acceleration sensor and also to connect the drive direction of the frequency converter to the direction of movement indicated by the acceleration sensor.

In a preferred embodiment of the invention the frequency converter comprises a speed control loop. The aforementioned control unit is arranged to select the polarity of the speed control loop on the basis of the measuring signal of the acceleration sensor. The control unit is further arranged to select the polarity of the angular feedback of the electric machine to be controlled with the frequency converter on the basis of the measuring signal of the acceleration sensor.

The elevator control unit according to the invention comprises an input for the measuring signal of the sensor that detects the direction of movement of the elevator car. The elevator control unit is arranged to detect the direction of movement of the elevator car indicated by the sensor that detects the direction of movement of the elevator car from the measuring signal of the sensor that detects the direction of movement of the aforementioned elevator car. In one embodiment of the invention the elevator control unit is arranged to form a speed reference of the elevator for driving the elevator car in the detected drive direction. In this case the speed reference formed by the elevator control unit contains information about the detected direction of movement of the elevator car.

In a preferred embodiment of the invention the aforementioned sensor that detects the direction of movement of the elevator car is an acceleration sensor.

The control of the electric drive according to the invention can also be implemented as a so-called sensorless control, in which case the speed control loop does not comprise a feedback from a separate sensor that determines the rotational movement of the electric machine. Also in this case the directions of movement of a transport appliance, such as of an elevator car, can be detected and the detected directions of movement can be connected to the drive directions of the sensorless control in the manner presented in the invention.

The aforementioned summary, as well as the additional features and advantages of the invention presented below, will be better understood by the aid of the following description of some embodiments, said description not limiting the scope of application of the invention.

MORE DETAILED DESCRIPTION OF PREFERRED EMBODIMENTS OF THE INVENTION

Figure 1:
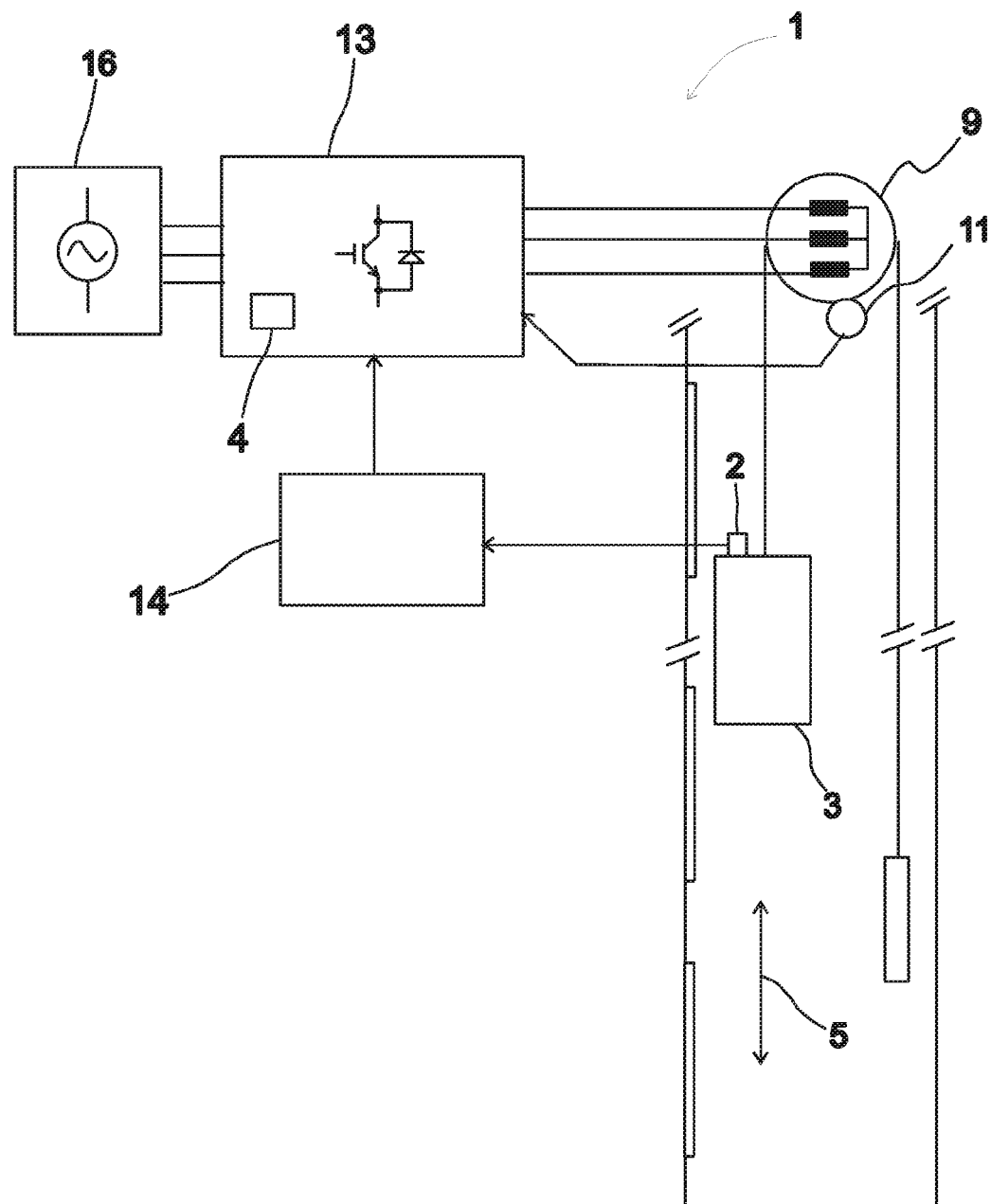
FIG. 1 presents an elevator system according to the invention, as a block diagram

FIG. 1 presents a construction-time elevator system, in which the electric drive 1 is installed into its position. The electric drive 1 comprises a frequency converter 13 as well as the hoisting machine 9 of the elevator. The control of the electric drive comprises a control unit 4 of the frequency converter in addition to an elevator control unit 14. The elevator car 3 is suspended in the elevator hoistway with ropes, a belt or corresponding passing via the traction sheave of the hoisting machine 9 of the elevator. The hoisting machine 9 of the elevator is, in this embodiment of the invention, fixed to the guide rail (not in figure) of the elevator car, in a space between the guide rail and the wall of the elevator hoistway. The hoisting machine 9 could, however, also be fixed to a special machine bedplate, and the machine could also be disposed in a machine room instead of in the elevator hoistway.

The power supply to the alternating-electricity motor of the hoisting machine 9 of the elevator occurs with a frequency converter 13 from an electricity network 16. Also the frequency converter 13 is disposed, in this embodiment of the invention, in the elevator hoistway, in connection with a wall part of the elevator hoistway.

An acceleration sensor 2 is fitted in connection with the elevator car 3 such that the acceleration sensor 2 moves along with the elevator car in the elevator hoistway. VTI's sensor, that has the type number SCA610 and that detects the essentially vertical movement of an elevator car, is used here as a sensor. Many other types of acceleration sensors that also measure the acceleration due to gravity could, however, also be used as a sensor. By means of this type of sensor that measures the acceleration due to gravity, it is possible to determine explicitly the direction of movement of the elevator car 3.

The startup of the electric drive 1 occurs essentially automatically such that a fitter sends a startup command to the elevator control unit 14 from an interface disposed in connection with an entrance to the elevator hoistway. Also the elevator control unit 14 is disposed, in this embodiment of the invention, in the elevator hoistway. After having received the startup command the elevator control unit 14 sends a run command containing a drive direction to the frequency converter 13, in which case the frequency converter drives the elevator in the drive direction indicated by the elevator control unit. The elevator control unit 14 receives the measuring signal of the acceleration sensor 2 fitted in connection with the elevator car and deduces on the basis of the measuring signal the direction of movement 5 of the elevator car corresponding to the drive direction of the frequency converter 13 in question. If the overall acceleration indicated by the measuring signal of the acceleration sensor 2 is in this case at least momentarily smaller than the acceleration due to gravity G, the constant value of which is roughly $9.81 \, m/s^2$, the elevator control unit 14 deduces that the elevator car is moving downwards. If the overall acceleration indicated by the measuring signal of the acceleration sensor 2 is, on the other hand, at least momentarily greater than the aforementioned acceleration due to gravity G, the elevator control unit 14 deduces that the elevator car is moving upwards. After it has thereby detected the direction of movement 5 of the elevator car corresponding to the drive direction of the frequency converter 13, the elevator control unit 14 connects the aforementioned drive direction of the frequency converter to the detected direction of movement 5 of the elevator car and records the combination in memory such that in future when it accepts a run request in the direction of movement 5 in question of the elevator car, the elevator control unit sends a command to the frequency converter to drive in that drive direction of the frequency converter which according to the combination recorded in memory corresponds to the direction of movement 5 of the elevator car according to the run request.

The aforementioned run command containing the drive direction can also contain the speed reference of the elevator formed by the elevator control unit 14. The control unit 4 of the frequency converter can comprise a speed control loop, in which the speed of rotation of the hoisting machine 9 of the elevator is adjusted towards the speed reference formed by the elevator control unit 14 by setting the current to be supplied to the hoisting machine of the elevator. The speed of rotation of the hoisting machine of the elevator is measured in this case e.g. with a pulse encoder 11 connected to the shaft of the hoisting machine of the elevator or to the traction sheave. In one embodiment of the invention the elevator is first driven by controlling the electric drive 1 without a speed feedback from the pulse encoder 11 of the hoisting machine of the elevator using a so-called open-loop control, and the elevator is driven with speed regulation using feedback from the pulse encoder 11 of the hoisting machine of the elevator only after detection of the directions of movement of the elevator car.

In one embodiment of the invention after detection of the directions of movement of the elevator car, the parameters of the control of the electric drive, such as the positive feedback of torque and also the amplification of the speed regulator, are fine-tuned by driving the elevator with speed regulation in both detected directions of movement. The positive feedback of torque is determined by collecting information about the torque requirement of the hoisting machine of the elevator during a run, such as about the torque reference formed by the speed regulator. The amplification of the speed regulator is adjusted by determining the frequency response of the speed control loop during a run with the elevator. A stability test is performed on the speed regulator on the basis of the measured frequency response, using e.g. a Bode plot or a root locus analysis, and the amplification of the speed regulator is adjusted such that the speed regulation is as stable as possible, in other words the speed regulator does not cause extra vibration during a run with the elevator. Other parameters of the control of the electric drive to be fine-tuned can be e.g. the masses of the elevator system that are to be moved and also the masses of inertia of the elevator system.

Figure 2:
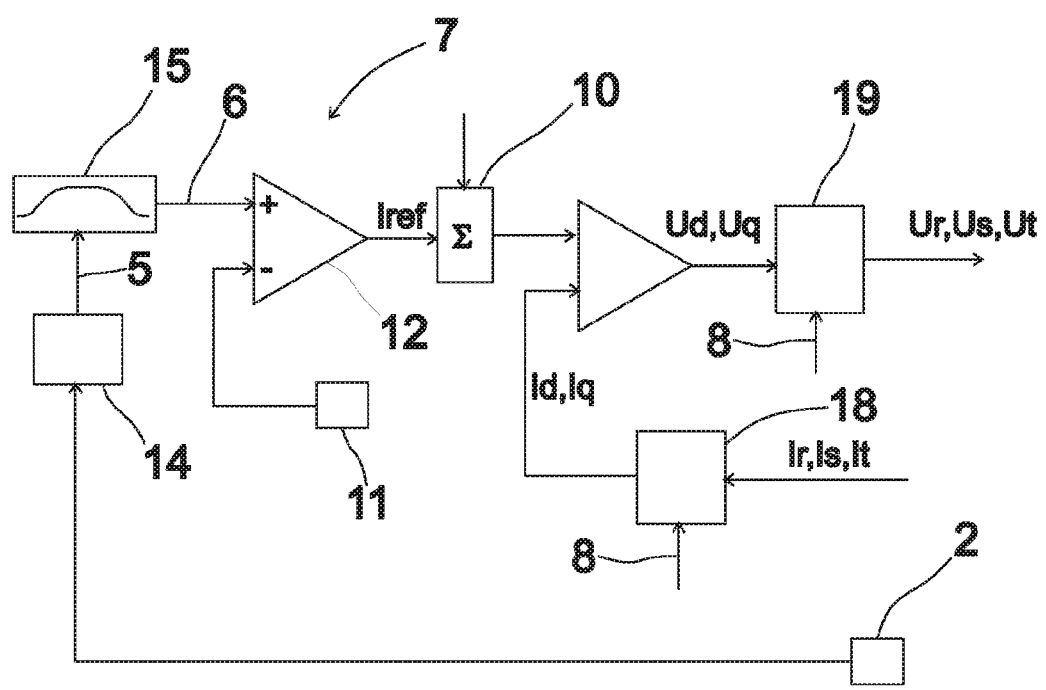
FIG. 2 illustrates the control of the electric drive according to the invention

FIG. 2 presents as a block diagram the control principle of one permanent-magnet synchronous motor, which principle is applicable for use e.g. in the elevator system of FIG. 1, when the hoisting machine 9 of the elevator comprises a permanent-magnet synchronous motor. The control of the electric drive comprises a speed control loop 7, in which the value of the speed reference 15 is compared to the speed feedback in the speed regulator 12 indicated by the movement measuring sensor 11 of the hoisting machine. The current reference Iref of the motor is obtained as the output of the speed regulator 12, which current reference is directly proportional to the required torque of the motor. The positive feedback 10 of torque is therefore summed into the current reference Iref, which positive feedback expresses an estimate of the required torque in the operating situation in question of the electric drive. The positive feedback can vary e.g. owing to the loading of the electric drive, the position of the transport appliance, such as of the elevator car, the selected speed profile, acceleration, deceleration, et cetera.

After the positive feedback 10, the current reference Iref is taken to the current regulator, which is implemented in an auxiliary two-axis d,q coordinate system rotating along with the permanently-magnetized rotor such that the currents in the direction of the d-axis and q-axis are regulated with separate current regulators. The q-axis is selected at a right angle with respect to the excitation axis of the rotor, and the current in the direction of the q-axis is directly proportional to the torque of the motor. The current reference Iref is taken to the current regulator that regulates current in the direction of the q-axis. Also the stator currents Ir, Is, It of the permanent-magnet synchronous motor are measured and converted into the d,q coordinate system in a conversion block 18. Angular feedback 8 about the position of the magnetic pole of the rotor is also needed for the conversion. The voltage references Ud, Uq in the direction of the d,q axes of the motor are obtained as an output of the current regulator, which voltage references are converted back into the three-phase magnitudes Ur, Us, Ut in the conversion block 19 using the angular feedback 8. The three-phase voltage references Ur, Us, Ut are taken to the pulse width modulator, which forms switching references for the solid-state switches, such as IGBT transistors, of the frequency converter.

The movement control unit 14 sends a speed reference 15 to the frequency converter, in which case the frequency converter drives in the drive direction according to the speed reference 15. The drive direction is in this case determined e.g. from the sign bit of the speed reference 15, from the polarity of the speed feedback and also from the polarity of the angular feedback 8. The movement control unit 14 receives the measuring signal of the acceleration sensor 2 and deduces on the basis of the measuring signal the direction of movement 5 of the transport appliance corresponding to the speed reference 15 in question. If the overall acceleration indicated by the measuring signal of the acceleration sensor 2 is in this case at least momentarily smaller than the acceleration due to gravity G, the constant value of which is roughly 9.81 m/s^2, the movement control unit 14 deduces that movement is occurring upwards. If the overall acceleration indicated by the measuring signal of the acceleration sensor 2 is, on the other hand, at least momentarily greater than the aforementioned acceleration due to gravity G, the movement control unit 14 deduces that movement is occurring downwards. After it has thereby detected the direction of movement 5 of the transport appliance corresponding to the drive direction of the frequency converter 13, the movement control unit 14 connects the aforementioned speed reference 15 to the detected direction of movement 5 of the transport appliance and records the combination in memory such that in future when it implements a run request in the direction of movement 5 in question, the movement control unit sends to the frequency converter a speed reference 15, which according to the combination recorded in memory corresponds to the direction of movement 5 of the transport appliance according to the run request.

Detection of the direction of movement of the transport appliance can also occur in the control unit of the frequency converter, and the frequency converter can also comprise an input for the measuring signal of the acceleration sensor 2 fitted in connection with the transport appliance, in which case a separate movement control unit 14 is not necessarily needed. On the other hand, the drive direction of the frequency converter can be connected to the detected direction of movement of the transport appliance also e.g. by selecting the polarity of the speed feedback such that the transport appliance moves in the desired detected direction of movement. Furthermore, the polarity of the angular feedback 8 to be used in the control of the permanent-magnet synchronous motor can be selected such that when the rotor rotates the position of the magnetic pole changes in the direction of rotation that corresponds to the intended direction of movement of the transport appliance.

The invention is suited for use also e.g. in cranes, in addition to elevators, in which case the transport appliance can be e.g. the load to be moved by a crane, instead of an elevator car.

The elevator system according to the invention can be provided with a counterweight or can be one without a counterweight; furthermore, the elevator according to the invention can be a passenger elevator or a freight elevator.

The invention is described above by the aid of a few examples of its embodiment. It is obvious to the person skilled in the art that the invention is not limited only to the embodiments described above, but that many other applications are possible within the scope of the inventive concept defined by the claims presented below.

The invention claimed is:

1. A method for initiating an electric drive of an elevator including a frequency converter and an acceleration sensor configured to detect a direction of movement of an elevator car, the method comprising:
    initiating movement of the elevator car;
    detecting the direction of movement of the elevator car based on a measurement signal from the acceleration sensor; and
    associating a drive direction of the frequency converter with the detected direction of movement of the elevator car.

2. The method according to claim 1, wherein the initiating the movement of the elevator car comprises:
    driving the elevator with the electric drive.

3. The method according to claim 2, further comprising:
    recording, in a memory, the drive direction of the frequency converter and the detected direction of movement of the elevator car.

4. The method according claim 1, wherein the acceleration sensor is on the elevator car.

5. The method according to claim 1, further comprising:
    selecting a polarity of a speed control loop to control the electric drive based on the detected direction of movement of the elevator car.

6. The method according to claim 1, further comprising:
    selecting a polarity of an angular feedback to control the electric drive based on the detected direction of movement of the elevator car.

7. The method according to claim 1, further comprising:
    driving the elevator with the electric drive in the detected direction of movement.

8. The method according to claim 7, wherein information about a torque requirement of a hoisting machine of the elevator is collected during an elevator run, and positive feedback of torque to control the electric drive is adjusted based on the information collected during the elevator run.

9. The method according to claim 1, further comprising:
    driving the elevator by controlling the electric drive without feedback from a movement measuring sensor of a hoisting machine configured to detect the direction of movement of the elevator car.

10. The method according to claim 7, wherein the driving the elevator comprises:
    driving the elevator using a speed control loop to determine a torque requirement of a hoisting machine.

11. The method according to claim 7, further comprising:
    determining a frequency response of a speed control loop in connection with an elevator run; and adjusting an amplification of a speed regulator based on the frequency response of the speed control loop.

12. The method according to claim 7, further comprising:
determining a torque requirement of a hoisting machine of the elevator;
wherein the direction of movement of the elevator car is detected and the torque requirement of the hoisting machine is determined during a same elevator run.

13. The method according to claim 1, further comprising:
preselecting parameters for control of the electric drive using configuration software.

14. A frequency converter to control an electric drive, the frequency converter comprising:
a control unit configured to,
detect a direction of movement of an elevator car based on a measurement signal from an acceleration sensor, and
associate a drive direction of the frequency converter with the detected direction of movement.

15. The frequency converter according to claim 14, wherein the control unit comprises:
a memory; wherein
the control unit is further configured to store the drive direction of the frequency converter and the detected direction of movement in the memory.

16. The frequency converter according to claim 14, further comprising:
a speed control loop; wherein
the control unit is further configured to select a polarity of the speed control loop based on the measurement signal from the acceleration sensor.

17. The frequency converter according to claim 14, wherein the control unit is further configured to select a polarity of an angular feedback of an electric machine to be controlled with the frequency converter based on the measurement signal from the acceleration sensor.

18. The method of claim 1, wherein the measurement signal is indicative of the acceleration of the elevator car relative to gravity.

19. The method of claim 14, wherein the measurement signal is indicative of the acceleration of the elevator car relative to gravity.

* * * * *